United States Patent [19]

Hamamdjian

[11] Patent Number: 5,581,499
[45] Date of Patent: Dec. 3, 1996

[54] MICRO INFORMATION STORAGE SYSTEM

[76] Inventor: Gilbert Hamamdjian, 10 Place Dominique Ingres - 3B, 51100 Reims, France

[21] Appl. No.: 469,210

[22] Filed: Jun. 6, 1995

[51] Int. Cl.⁶ .................... G11C 13/00; G11C 13/04; G01B 9/10; H01S 3/16
[52] U.S. Cl. .............. 365/106; 365/110; 365/118; 365/119; 365/121; 365/127; 365/128; 365/215; 365/234; 365/244; 250/227.31; 372/42; 395/25; 395/934
[58] Field of Search ................ 365/106, 110, 365/118, 119, 121, 127, 128, 215, 234, 244; 250/227.31; 372/42; 395/25, 934

[56] References Cited

U.S. PATENT DOCUMENTS

| | | | |
|---|---|---|---|
| 3,440,621 | 4/1969 | Knapp | 340/173 |
| 3,515,880 | 6/1970 | Letter | 340/173 |
| 3,543,248 | 11/1970 | Oliver | 340/173 |
| 3,568,167 | 3/1971 | Carson | 365/119 |
| 3,771,150 | 11/1973 | Schneider | 365/119 |
| 3,820,087 | 6/1974 | Chaudhari et al. | 365/234 |
| 3,849,766 | 11/1974 | Crowther et al. | 365/127 |
| 3,912,391 | 10/1975 | Fleisher et al. | 365/120 |
| 3,940,748 | 2/1976 | Carson | 365/119 |
| 3,980,818 | 9/1976 | Browning | 365/215 |
| 4,113,353 | 9/1978 | Matsushita | 385/147 |
| 4,246,337 | 1/1981 | Borrelli et al. | 430/496 |
| 4,288,861 | 9/1981 | Swainson et al. | 365/127 |
| 4,649,518 | 3/1987 | Sadjian | 365/119 |
| 4,811,289 | 3/1989 | Sadjian | 365/119 |
| 5,268,862 | 12/1993 | Rentzepis | 365/151 |

*Primary Examiner*—David C. Nelms
*Assistant Examiner*—Trong Phan
*Attorney, Agent, or Firm*—Michael J. Ram; Marvin H. Kleinberg; Marshall A. Lerner

[57] ABSTRACT

A device for optically storing and retrieving information incorporating a cadmium fluoride crystal. Using focused ionizing radiation, patterns can be formed in the crystal by the creation of color centers and/or intrinsic luminescence quenched areas. The stored information can then be retrieved by irradiating the crystal with visible light, ultraviolet light, ionizing radiation or combinations thereof. The device and the storage technique allows the storage of various different levels of information, the different levels being retrievable by using different irradiating media and magnifications of the retrieved information. The device and technique also allows the information to be stored for a predetermined period of time.

17 Claims, 4 Drawing Sheets

MICRO INFORMATION STORAGE SYSTEM

BACKGROUND OF THE INVENTION

The present invention relates to a method of information storage. More specifically it relates to a method of storing information by creating color centers or quenching luminescence or both within a crystal of cadmium fluoride using focused ionizing radiation.

A number of parameters are relevant to determining the best choice of a data storage system for a particular application. Among these are 1) ease of recording the information (i.e., what special equipment is needed, how much time does it take); 2) compactness of the recorded information and storage criteria, 3) permanence and erasability, and 4) ease of reading. In addition, a potentially desirable characteristic, especially for storage of information which has a designed, limited usage, is the controllability of the time duration of the information storage. For example, if information is recorded in such a manner that it will effectively disappear after a predetermined period of time, the usability of a credit card, identification badge or other similar device could be automatically terminated by the expiration of the device by disappearance of the recorded information.

Further, "ease of reading" may either be a desired or an undesired characteristic. For example, it may be desirable that information only be accessible by means of a machine that is not generally available to the public. For instance, if the information stored is to be maintained as a secret, the more difficult it is to access, the harder it will be for others to obtain the information.

"Ease of writing" has both negative and positive implications for the security industry. Ideally, recording and storage of information should be easy and economical for those who have access to the correct equipment but difficult for anyone else. One of the reasons that credit card forgery is a major problem is that the information that is on the magnetic data storage strip that runs across the back of most credit cards is easy to access and change.

Several investigators have explored the use of optical memory crystals having light sensitive color centers as an information storage medium. Ionic crystals, such as alkali halides, have been specifically identified as usable for these purposes. The simplest color centers, also referred to as F centers, are local imperfections in a crystal lattice, such as that caused by an electron filling the space left by a missing ion, such as a missing halogen ion. The electron provides electrical neutrality of the structure as a whole. However, on an atomic level it behaves differently from the missing ion because it is more weakly bound to the other components of the crystal structure than electrons in the missing ion. As a result, the space filling electron can more readily absorb energy, such as light photons, and becomes excited from a ground state to a state closer to the energy level of the conduction band of the crystal with further absorption of energy causing the electron to reach the conduction state of the crystal and be eventually transferred to a neighboring F center, which then becomes an F' center containing two electrons. In certain crystals the F centers may regroup into groups of three F centers, known as R centers which, under certain circumstances, can be extremely stable. The process of exciting a space filling electron so that it jumps to a neighboring F center is a bleaching process because the now vacant space is no longer capable of absorbing light of the frequency necessary to excite the electron and, as a result, the space is colorless. As a result, most alkali halide crystals at room temperature are readily bleached by a strong beam of light having the proper wave length. Lowering the temperature, for example to liquid air temperatures can prevent bleaching. In contrast, thereto, in some crystals of refractory materials the energy difference between the excited state of the space filling electron and the conduction band of the crystal is sufficiently large that bleaching at room temperature is unlikely. Accordingly, controlled bleaching of defined locations to form vacated spaces, F' and/or R centers can be used as an information storage technique.

U.S. Pat. No. 3,440,621, granted to Knapp teaches the use of F centers, R centers and U centers, created on crystalline alkali halide material containing hydrogen as a method of information storage. F centers and R centers are discussed above. A U center is made up of a hydrogen atom and an electron in the crystal lattice space usually filled with a halogen ion. An F center crystal has a characteristic color; hydrogenating the crystal changes the absorption characteristics of the crystal so that it is colorless, clear and transparent to F light but absorbent to UV light. Illuminating the crystal with UV light ejects the hydrogen from the U center to interstitial positions and F light exposure creates R centers. Controlled formation of the R centers constitutes information storage. The information is then read by shining light of a color that is absorbed by the R-centers through the device. The light passes through the crystal at all points where an R center exists, creating a negative projected image which can be magnified and displayed on a screen. The preferred composition is a solid mixture of sodium chloride and sodium bromide with hydrogen. A second composition is hydrogenated potassium chloride.

U.S. Pat. No. 3,940,748 to Carson is directed to an optical storage and retrieval system which uses beams of intersecting coherent light, i.e. laser beams, at least one of which is information bearing, to change the color state of color centers in ionic crystals such as alkali halides. In particular, the first light is the excitation or F light while the second light is the ionizing light used to create the F' center.

U.S. Pat. No. 3,515,880, granted to Letter, describes a device using fluorides of lead, cerium and lanthanide in a glass matrix which has the capability of transforming the stored optical information into electrical impulses suitable for connection with a printer or a data processing unit.

U.S. Pat. No. 4,038,647, granted to Schneider, teaches a method for using an alkali halide crystals (KCl, NaF, KF) containing anisotropic centers (i.e., $F_A$, M or $M_A$ centers) in ionic crystals with a dopant alkali halide of a smaller size than the host crystal to store holographic information.

Studies of color centers in crystals of the fluorite structure has mostly been confined to the alkali halides, alkaline earth oxides and alkaline earth fluorides ($CaF_2$, $SrF_2$, $BaF_2$ but not $BeF_2$ or $MgF_2$ as these two compounds do not have the fluorite structure) and some exploration of the use of $SrCl_2$, $ThO_2$, $CeO_2$, and $PbO_2$ has been reported. However, in contrast to alkali halides, the alkaline earth halides behave differently regarding colorability. For example while $CaF_2$ can be additively colored, if rapidly cooled, to generate two principle absorption bands, with temperature dependence resembling the alkali halides (Mollwo, as reported by Schulman et al, *Color Centers in Solids*, Macmillan, p 275–276, (1962)) and with mobility magnitudes of the F centers similar to the alkali halides (concentrations as high as $10^{22}/cm^3$), when exposed to massive doses of X-radiation they form low color center concentrations (Smakula, A., *Phys. Rev.*, 77, 1950: Schulman, ibid., p 276). The behavior and colorability of these crystals can be modified by doping with other ions such as NaF, CeF$_2$, or trivalent rare earth ions (Eu$^{3+}$,Gd$^{3+}$).

While Cadmium fluoride is a divalent compound with some similarities in behavior to calcium fluoride, Cadmium halides differ in several respects from both the behavior of the alkali halides and CaF$_2$. For example, while CaCl$_2$ as an additive to alkali halides results in the formation of many more F centers, NaCl doped with CdCl$_2$ behaves just like undoped NaCl. Further, while CaF$_2$ can be additively colored, additive coloration of CdF$_2$ is not achievable suggesting that this material also has a high resistance to coloration by ionizing radiation. Cadmium Fluoride (CdF$_2$) was examined and characterized notably by Martin Rubenstein and Ephraim Banks ("Color Centers in Cadmium Fluoride", *J. Electrochem. Soc*, 106, pp 404–409 (1959)) and pure and doped CdF$_2$ was investigated by Benci et. al. ("Recombination Luminescence in Pure and Rare Earth Doped CdF$_2$", *J. of Luminescence*, 11, pp 349–355, (1976)). Rubenstein et al were able to demonstrate the formation of an absorption band at 255 mμ which was not bleached by heating (up to 150° C.), or on exposure to UV or IR radiation by irradiation of CdF$_2$ for several hours with X-rays. Rubenstein et al were also able to generate a double band peaking at about 255 and 350 by X-ray irradiation of the crystal for 5 hours at −190° C. or −78° C. However, the X-ray produced bands totally bleached at −10°. Cadmium fluoride is a highly ionic, transparent solid which crystallizes in the fluorite structure. The Cd$^{2+}$ ion has a high electron affinity so that the band gap is particularly low (about 7.6 eV) when compared to alkaline earth fluorides. Moreover, it cannot be additively colored because the crystal has a low conduction band resulting thus in the electrons not being held within fluorine vacancies preventing formation of stable F centers or not being deeply trapped by the coulomb field of trivalent cations added to the crystal lattice. Because of the coloring and bleaching characteristics of CdF$_2$, investigators into the phenomenon of color centers have disregarded CdF$_2$ as suitable for information storage purposes.

SUMMARY OF THE INVENTION

Contrary to the teachings in the prior art, it has now been discovered that cadmium fluoride can be efficiently colored at room temperature and F centers, and aggregates of F centers can be produced with a focused electron beam. One of the methods for storing information using the present invention is the creation of anisotropic centers in CdF$_2$.

Clusters of F-centers made in a CdF$_2$ crystal lattice in accordance with the invention decay at a rate which is roughly predictable and repeatable. Therefore, data storage may be made in such a manner that it disappears after a period of time which may be set at the time the information is stored.

Another advantage is that the information storage operations may be performed at room temperature. This allows for a reduction in expensive information storage process.

Yet another advantage is that the size and structure of the information stored can be selected to control the type of reading mechanism that will be necessary to detect the information. If it is desired to allow access to the information only to those who are equipped with expensive and difficult to procure equipment, the encoding may be done in a very tiny form which is readable only by a scanning electron microscope. The encoding can also be accomplished in such a manner as to allow reading with a simple optical device.

Yet one more advantage is that the wide spectrum of light blocked by color centers in a cadmium fluoride crystal allows a very broad spectral band over which the information may be read. This allows devices using ambient light to be used to read the information.

BRIEF DESCRIPTION OF THE DRAWINGS

These and other features, aspects and advantages of the present invention will become better understood with reference to the following description, appended claims, and accompanying drawings, where:

DETAILED DESCRIPTION OF THE PREFERRED EMBODIMENT

Figure 1:
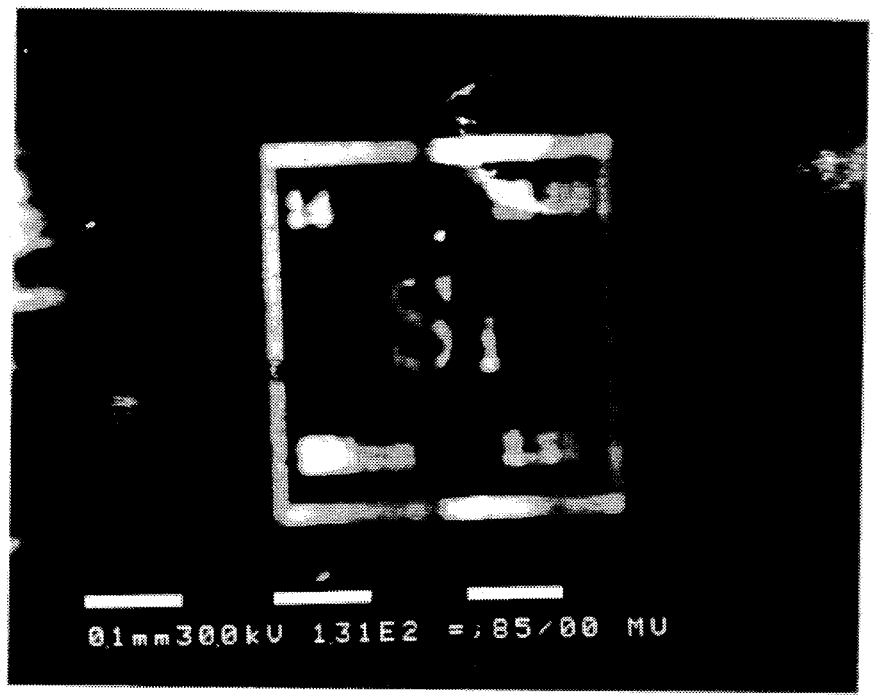
FIG. 1 is a photomicrograph of information stored on a CdF$_2$ crystal incorporating features of the invention.

In contrast to CaF$_2$, it has been found that CdF$_2$ behaves more like alkali halides in regard to coloration by ionizing radiation, producing notably F, and aggregates of F centers. In one embodiment, an electron beam is used to create color centers in a cadmium fluoride substrate. While the process must be performed in a vacuum, it can be conducted at room temperature and is stable at room temperature if shielded from strong ambient light. Further, the F center and F center aggregates absorption band, which extends from 300 nm and peaks in the very near ultraviolet, is unexpectedly wide, decreasing smoothly till near infrared.

The cadmium fluoride crystal can be prepared by any one of the procedures set forth in the literature. One particularly suitable method is known as the Bridgeman technique. The starting material should be as pure as possible as undesirable impurities will effect the properties of the resultant crystal. Additionally, care must be taken to avoid contamination by hydrocarbon molecules as they can cause effects similar to that observed in the writing process. Trivalent ions and particularly trifluorides of rare earths (Er$^{3+}$, Sm$^{3+}$), and monovalent ions like Na$^+$ (from NaF), Li$^+$, K$^+$, can be added to the molten cadmium fluoride to prepare doped crystals with properties modified in a controlled manner. When CdF$_2$ crystals are doped with certain materials and then irradiated with electrons, the crystals, in addition to intrinsic luminescence, also exhibit bands characteristic of the dopant. If the dopant is a trivalent rare earth ion the added bands can be particularly sharp and intense.

The crystal should also be coated on its back surface allowing the specimen to be grounded during the writing operation, in order to prevent charging which perturbs the storage.

The electron beam of an electron microscope (controlled by a programmed computer) is used to write on the crystal. To detect the relatively weak luminescence, the electron microscope should also be equipped with suitable optical lenses, mirrors, light pipes, photomultipliers, spectrometers for observing and recording the coloration and the fluorescence quenching process.

Because the color centers in $CdF_2$ absorb light in a wide range of wavelengths, the stored information can be read with white light which for relatively low magnification, can be ambient light. However, the utility of the $CdF_2$ crystals is not limited to retrieving information using visible or ultraviolet light. Because of some very unusual phenomena which occur during color center formation in $CdF_2$ crystals, additional information can be recovered by using other forms of illumination. For example, quenching of the intrinsic luminescence within small irradiated volumes generates information retrievable by recording the light output excited by a low power ionizing beam, such as an electron beam. Other manifestations of the stored information which can be used in reading the stored information are the decrease in the yield of emitted secondary electrons, or in the local density of the crystal, the inhibition of local absorbed current, the relative extinction of the characteristic X-ray $FK\alpha$ emission line, all being retrieved using the same low energy electron beam.

The storage of information on pure or doped $CdF_2$ crystals is accomplished by applying a focused energetic electron beam to the surface of the crystal to create a concentration of color centers and/or to produce efficient quenching of impurity fluorescence. For a given dopant with a known concentration, an electron beam of a specific energy and intensity, and an irradiation time, depending on the desired range of life time of the information to be stored, a higher energy density deposited results in a longer lifetime of the color centers. In regard to the effect of dopant molecules, the efficiency of formation of color centers (F and its aggregates) increases from least to greatest as follows:

trivalent ion doped semiconductor $CdF_2 \leq$ trivalent ion doped insulating $CdF_2 \leq$ pure insulating $CdF_2 \leq$ monovalent ion doped insulating $CdF_2$.

Additionally, when the crystal is doped, a suitable concentration of the dopant is required to obtain an optimal emission yield to occur when retrieved by ultraviolet or electron excitation. For example, a concentration of about 0.01 mole % of erbium is suitable for that purpose.

To read the stored information by excitation with an electron beam, such as that in a scanning electron microscope, the energy density deposited in the crystal should be minimized as repeated reading operations can result in the alteration of the initial stored pattern by, for example, formation of new color centers which will affect the pattern contrast. This is accomplished by raising the energy while lowering the intensity of the beam. However, under optimized storage conditions, i.e. a high number of color centers per unit volume, and with control of exposure to ambient light the information can be read numerous times (billions of cycles) resulting in a useful life of the stored information of several years before the decrease in contrast makes reading difficult.

The invention is contemplated to include at least three embodiments:

1) A single crystal of cadmium fluoride, either pure or doped with additives such as monovalent and/or trivalent cations, is written on using an ionizing radiation. The storage medium is then illuminated by visible, white monochromatic light, and/or ultraviolet light and data retrieval is based on the detection of only visible light bearing the information (based on color center absorption).

2) A single crystal of cadmium fluoride either pure or doped with additives such as monovalent or trivalent cations, is written on means of ionizing radiation. The crystal is then illuminated by visible, white or monochromatic light, and/or ultraviolet light and data based on color centers are retrieved by detecting either visible or ultraviolet light.

3) A single crystal of cadmium fluoride either pure or doped with additives such as monovalent and/or trivalent cations is written on using a suitable radiation to create color centers and/or to produce a quenching of the impurity fluorescence. The storage crystal is then illuminated either by light and/or by any other suitable radiation—such an electron beam—which enable a readout of the stored information as described in detailed in later sections.

FIG. 1 is a photomicrograph of information stored on a $CdF_2$ crystal using 30 kV and a 10 nA electron beam, the information being retrieved using an electron-excited specimen current signal. The bright (white) regions correspond to areas where color centers have been produced, causing a decrease in the local material density, by ejection of lattice fluorides from their normal location to distant positions. While FIG. 1 shows analog stored information, digital (binary) data can likewise be stored. If information stored by color center formation is to be retrieved by use of visible or U.V. light, a relatively high density of color centers per unit area is necessary. However, if electron excitation is used for retrieval, a much lower density of color centers is required because of the high resolution achievable using an electron microscope and high sensitivity sensors. The yield of color centers can be greatly improved by doping crystal with, for example, NaF which inhibits the F center formation. In this case, the size of an information bit is reduced for identical excitation conditions when compared to an undoped crystal. Optimization of information storage conditions is accomplished by increasing the duration of irradiation and/or using a higher primary current intensities. Stored information on either pure or doped $CdF_2$ crystals can be erased by heating the crystal to at least about 240° C., the crystal being returned to its unwritten state for the entry of new information.

Storage based on Color Center Generation

Effect of Excitation Conditions—Because the lifetime of a stored pattern is a key feature of the invention, it is important to understand the principal factors influencing the lifetime of one element of information, i.e. a "data bit".

A major factor which influences the lifetime of a bit of information is the number of color centers per unit area existing within this bit. An optimal density requires an optimization of the energy of irradiation deposited per unit area which in turn depends, for a given dopant and dopant concentration, on two factors: the time necessary to store one bit of information of a given size and the density of power injected into the material by the incident writing beam at the point of impact.

In cadmium fluoride, the density of color centers cannot be derived using the simple original mathematical relation used for other materials, known as the Smakula equation, or other more recently generalized equations, owing to a number of included assumptions which are not met with the cadmium fluoride crystal. For quantitative investigations involving cadmium fluoride, the optical density can be correlated to other measurable signals, such as the drop in cathodoluminescence or secondary emission intensities, since increasing the color centers density within one information bit is equivalent to raising the local optical density (the optical density is the logarithm of the ratio of light intensity transmitted by uncolored crystal to that transmitted when this crystal is colored).

The process of increasing the lifetime of an element of information through the creation of color centers with higher density lead to an increase, to some extent, of the size of this information and thereby lowers the density of data that can be accommodated within the stored pattern. This is because the dimension of an irradiation "spot" depends on the amount of energy deposited by the ionizing beam into the material at the point of impact. (The "bit size" refers to the lateral geometrical extension of the produced irradiation spot as detected through one of the multiple available signals, and should be defined with respect to the half-width of the corresponding intensity profile). It is not possible, therefore, to simply relate the small volume containing the information to the depth of penetration of incident electrons within the bulk of $CdF_2$ as is the case for a great number of other materials.

Figure 2:
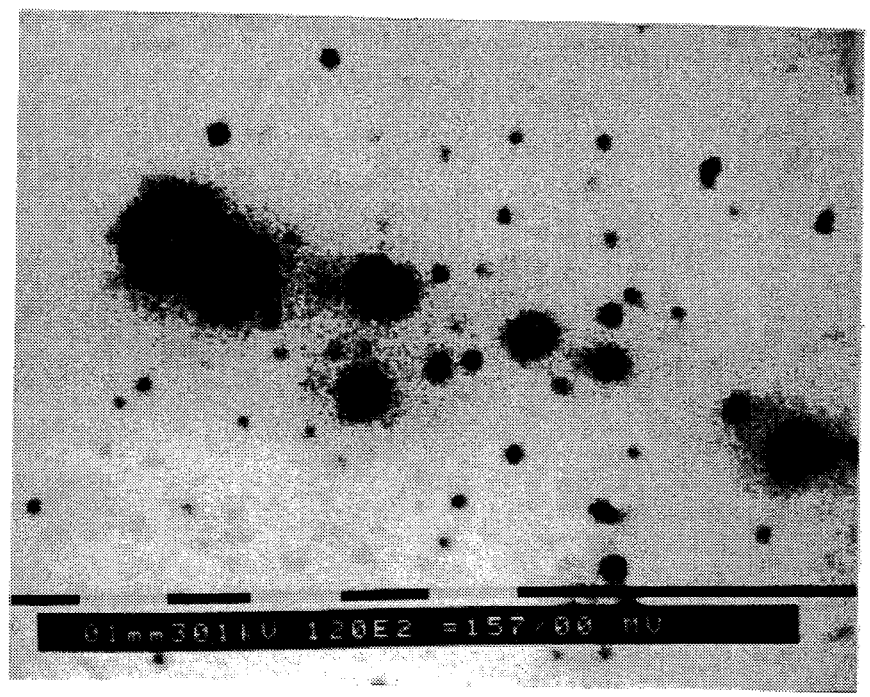
FIG. 2 is a photomicrograph showing color centers of different size generated by different exposure times to incident, focused electron beam energy.

The dependence of the size of one information bit (and indirectly the lifetime of this bit) on the time spent to generate this information is illustrated in the micrograph of FIG. 2. This figure shows, the "damages" produced in the cathodoluminescence integral mode, i.e., all wavelengths are detected simultaneously in the visible and ultraviolet up to 100 nm as a result of spot bombardment (spot diameter <0.5 μm), at different points of an undoped $CdF_2$ crystal. The dark spots are regions where the intrinsic cathodoluminescence is quenched (more or less efficiently) which in turn correspond to small volumes where color centers build-up. In this local coloration process, an important fraction of selftrapped exitrons which were radiatively recombining to give-up the observed intrinsic luminescence are now recombining non-radiatively and converted into well separated F centers and fluorine molecules or equivalently H centers. These H centers are propulsed owing to an efficient radiolysis mechanism to distances from the nascent F centers sufficiently great to permit their stabilization; these distances can attain tens of microns. This phenomenon is clearly shown in FIG. 2 where the different spot diameters are the result only of the variation of the time of irradiation from seconds to a few minutes.

Since a maximum electron energy of 30 kV has been used to produce the information bits, it can be seen that the radius of some spots, which exceed 25 microns, is many times greater than the depth of penetration of incident electrons in cadmium fluoride, which at this energy is about 4.2 microns.

The penetration depth of electrons in $CdF_2$ is either estimated by Monte-Carlo analysis or evaluated using some established relations that satisfactorily fit different experimental data. The validity of these methods is notably dependent on the absence of any effect leading to material damage such as specimen heating or defect formation. This is accomplished in cadmium fluoride exposed to electron irradiation when the energy per unit area absorbed by the crystal is sufficiently small. This is achieved by using low beam powers with high energy and large irradiated surfaces (i.e., low magnifications in the electron microscope). Experimental results on cadmium fluoride have been shown to be in good agreement with Monte-Carlo trajectory analysis and satisfactorily fits the well known Kanaya—Okayama equation giving the electron range inside material bulks; in undoped $CdF_2$ this equation takes the form: $R=0.01450\ E^{5/3}$ μm, where the energy is in units of kiloelectronvolts and the distance travelled by incident electrons R, is in microns.

Owing to the low value of the weighted atomic number of cadmium fluoride (38.147) a spherical interaction volume can be assumed. If the size of one information is determined only by the depth of penetration of electrons into the material, then the diameter of one information "spot" will be no greater than about twice the value of this range i.e., for example ~1.4 μm and ~4.4 μm at respectively 10 keV and 20 keV. An information density exceeding $10^7$ bit/cm$^2$ is thus obtained. However, in the writing process, since a high density of energy is injected to generate color centers, data density lower than the above value is achieved because of the increase of the size of each bit. In fact, whenever the radiolysis mechanism occurs with appreciable efficiency, the local density of the host compound is decreased owing to the removal of the lattice fluorides and their replacement by F electrons. On the other hand, owing to the large energy available within the small irradiated volume, other dynamic processes take place during the electron bombardment such as the migration of vacancies (the activation energy for this process ranges below about 0.5 eV) or the diffusion of interstitial fluorine ions or atoms. The result is that the incident electrons penetrate deeply into the material and F centers are formed at distances which readily exceed the classical penetration depth of the incident electrons. These effects become more pronounced as more energy is absorbed within the irradiated area, i.e., as the time of irradiation is prolonged.

Figure 3:
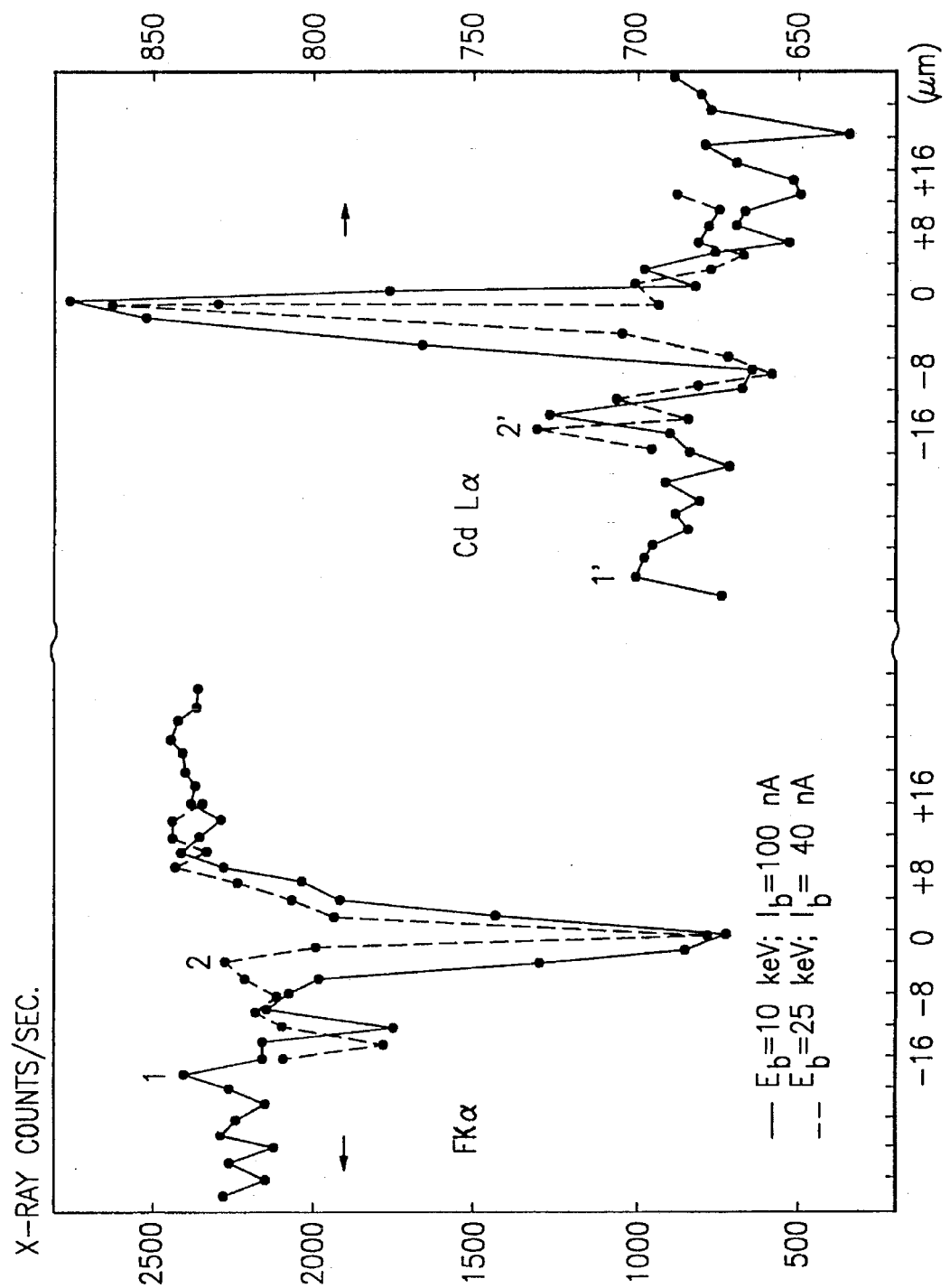
FIG. 3 is a graph showing the intensity profiles of emitted X-rays along the diameters of two information "spots" in an undoped CdF$_2$ sample.

The yield of color centers thus produced increases with the irradiation time and the density of power absorbed by the storage medium. However, the power dependence of color center formation in $CdF_2$ also causes an unusual phenomenon. FIG. 3 exhibits the intensity profiles of emitted X-rays along the diameters of two information "spots" in an undoped $CdF_2$ sample. 1 milliwatt of power and an irradiation time of six minutes was used to generate both bits of information, i.e. each bit. The two left curves, labeled 1 and 2, show the emission characteristic of the fluorine FKα X-ray lines and the two right curves, labeled 1' and 2', show the same information for the cadmium Lα lines. Since an information bit is associated with the presence of color centers, which implies removal of lattice fluorides, these color centers are maximal at the point of impact of the electron beam (0 μm in the figure). Inversely, the density of fluorides at this point is minimal and recovers its average maximum value at large distances. Curves 1 and 1' correspond to irradiation by a beam of energy 10 keV and intensity 100 nA; curves 2 and 2' correspond to an energy of 25 keV and an intensity of 40 nA.

The profiles shown in FIG. 3 were recorded using an electron probe of 10 keV energy and 10 nA intensity (in a Cameca microprobe of SX 50 type). The following results are noted:

a) The profiles corresponding to an electron energy of 10 keV (curves 1 and 1') have half-widths that are larger than those corresponding to an energy of 25 keV (curves 2 and 2').

b) Both intensity profiles have extensions (or widths exceeding the corresponding electron range. The effect is significant at lower energy where the width of the nearly gaussian profile of curve 1 of the FKα emission is more than ten times the 10 keV electron range (~0.68 μm).

c) While the density of fluorine decreases at the site of each information spot, a corresponding increase of cadmium concentration occurs, but at a much lower rate, i.e. a lower magnitude, as shown in curves 1' and 2'.

It is readily deduced from the above observations, as well as other supporting experimental data, that an optimal value for the density of color centers is obtained at a given beam power by raising the intensity of the primary current while selecting lower electron energies. However, this choice is achieved at the expense of the data density owing to the larger corresponding bit size. The fact that a higher number of color centers per unit area is obtained with a lower electron energy is accounted for because a 10 keV electron has a range which, according to the above equation, is equal to ~0.68 μm while a 25 keV electron penetrates into $CdF_2$ a distance of about 3.1 μm. The energy deposited by each electron per unit path within the bulk is, according to Bethe stopping power relation, greater at lower energy than at higher, so that the chain of processes a) involving electron— holes production, b) formation of selftrapped excitons, c) formation of separated F and H pairs along with the energy available for the ejection of the produced H centers at sufficiently large distances from the created F centers (so as to avoid a back reaction which lead to destruction of F centers), results in a greater density of color centers.

On the other hand, the decrease of fluorine concentration at and around the point of impact is such that the relative contribution of incident electrons to the emission of characteristic Cd Lα X-ray lines is increased. This is the primary cause of the increased intensity observed in FIG. 3, curves 1' and 2'.

Effect of doping—The efficiency of color centers creation is greatly improved by adding monovalent cations, such as sodium ions ($Na^+$), to a $CdF_2$ host lattice. The fluorine vacancies introduced in the crystal bulk as charge compensators, and which thus are present prior to any irradiation process, inhibits the F centers formation. These color centers originate partly as a result of introduction of $Na^+$ accompanying vacancies and partly from the nonradiative combination of a significant portion of selftrapped excitons. At the same time, the size of one information bit, when compared to an undoped material, is lowered for identical excitation conditions. This is a major advantage that can be exploited to improve both data density and the yield of color center formation.

An inverse behavior is obtained when trivalent cations, such as $Er^{+3}$ ions, are added to the pure cadmium fluoride. These ions short circuit the formation of self trapped excitons (an important fraction of which are at the origin of the F and H centers), by trapping free electrons or free excitons. This leads to a reduction in the number of F color centers formed. Additionally, the charge compensating interstitial fluorides can also capture holes or recombine with formed F centers, eventually resulting in a decrease in the yield of formation of self trapped excitons, F color centers and their aggregates.

In the present invention, the lifetime of the information recorded using the formation of color center can therefore be increased whenever needed by using insulating cadmium fluoride samples preferentially doped with monovalent cations. Optimization of storage conditions in this case is accomplished either by increasing the duration of irradiation when it is necessary or by selecting higher primary current intensities with lower electron energies for given beam powers. When higher values of information density are required, the task consists in raising the electron energy and lowering the magnitude of the beam intensity for a given power and irradiation time. Although densities higher than $10^7$ bits/cm² are readily achievable, because of the nature of the different types of applications contemplated for the present invention, much lower densities are suitable.

Because an object of the invention is to store patterns which, at the final state of the retrieving process, produce visual images and because the lifetime of a stored pattern, and thereby of stored information, is an important element of the utility of the storage process, emphasis has been on providing storage devices and systems which allow a large variation of the ionizing beam intensity. Electron microprobes are readily suitable for this purpose.

Retrieving devices—Once a suitable color center storage device is provided, a variety of commercially available devices can be used to retrieve the pattern stored based on color center phenomenon. Utilizing the absorption by these centers of visible light, then, depending on the scale of the stored pattern, monochromatic or white light sources can be used along with magnifying systems ranging from simple magnifiers to visual (pocket microscopes) or projection microscopes to view the stored information. When a magnification of several hundred times is required, readout in the transmitted mode is preferable and devices such as those used to retrieve microfilms can be used at a relatively low cost. When ultraviolet absorption is exploited, ultraviolet sources such as mercury vapor lamps can be used, the vapor pressure being such that either visible (high pressure) or ultraviolet (low pressure) emission is dominant depending on the application desired. For stored patterns having low reduction scale, commercially available bulbs of 3 watts power are suitable sources to achieve readout. Light with components in the near ultraviolet ($\geq 300$ nm) is suitable to read color center stored information. In this case, detection systems should be transparent in the ultraviolet region. For example, when quartz optics are used, fluorescent screens or electronic converters are necessary in order to transform the invisible radiation to a visible display.

Regarding other properties associated with the formation of color centers, such as the quenching of intrinsic luminescence secondary or characteristic FKα X-ray emission, an ionizing focused excitation, such as an electron beam in a scanning electron microscope is one possible solution. In this case, the readout operation must be carried out at low beam powers, relatively high energies and scanning rates and low magnifications in order to prevent formation of new F centers and their aggregates in regions which did not contain the original color centers. Otherwise, the readout operation could lead to loss of contrast when observing or recording the image.

Storage based on quenching of impurity (extrinsic) fluorescence

When $CdF_2$ samples doped with impurities, such as trivalent or monovalent cations, are irradiated with an electron beam, along with the decay of the intrinsic luminescence which accompanies the formation of color centers, a very efficient quenching of the fluorescence emitted by foreign ions takes place. Part of the energy of the incident ionizing radiation is used to eject light elements such as the sodium ion (Na+) or the charge compensating fluorine ions $F^{-1}$ (or atoms F°) away from the point of impact of the beam. Their presence is indispensable for the fluorescence emission to occur. Consequently, this fluorescence is quenched and the process takes place with increased efficiency as the energy density deposited into the material is increased. This is due to a rise in the amount of energy available for this process.

Figure 4:
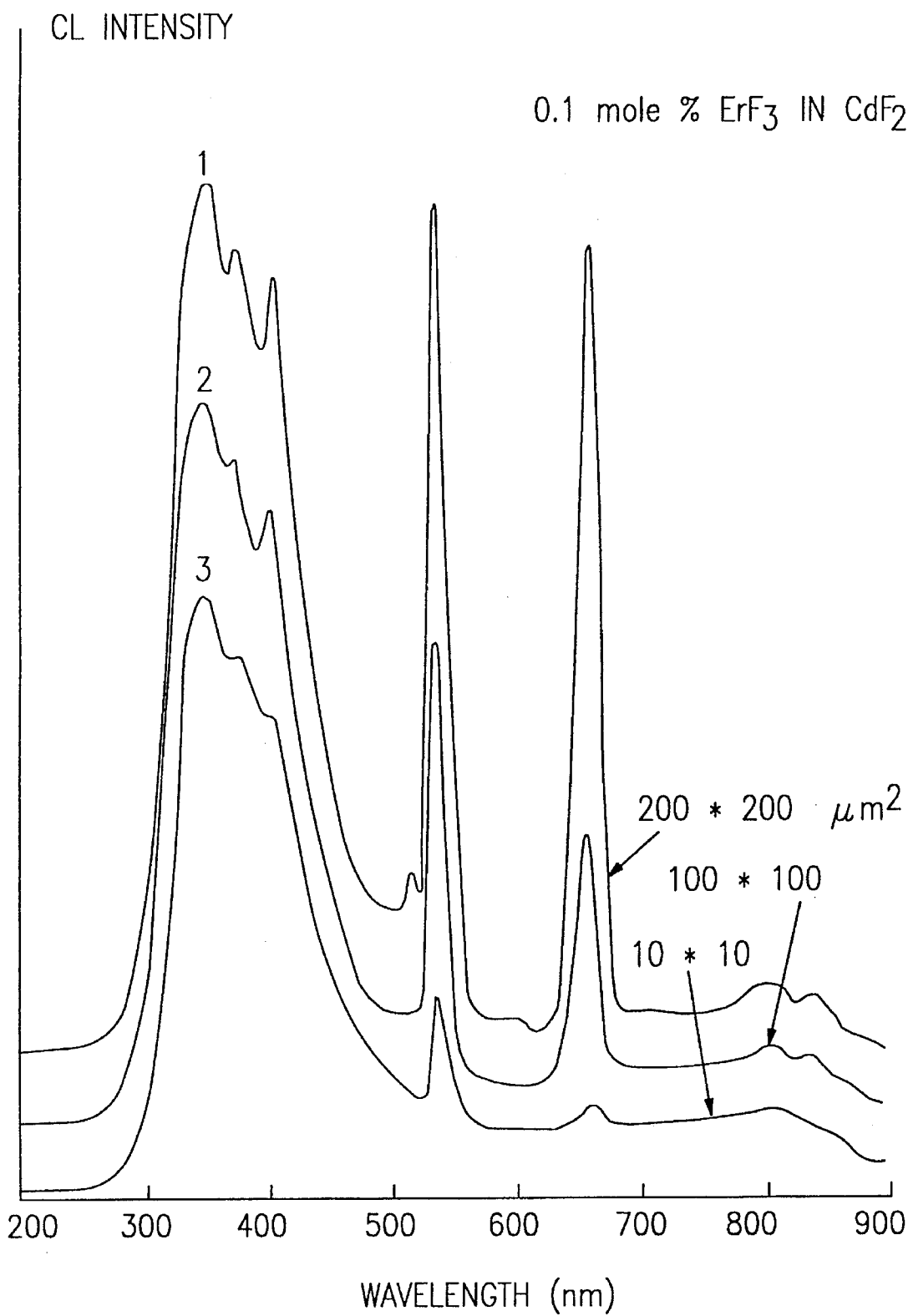
FIG. 4 shows the catholuminescence spectra of an insulating cadmium fluoride crystal doped with 0.1 mole % erbium.

FIG. 4 displays the catholuminescence spectra of an insulating cadmium fluoride crystal doped with 0.1 mole % erbium when irradiated using a 20 KeV, 12 nA electron beam. The three different curves correspond to irradiated surface of three different sizes 200×200 μm² (curve 1), 100×100 μm² (curve 2) and 10×10 μm² (curve 3). The total time for each spectrum is 180 seconds; the three spectra are shown shifted for the purpose of comparison. The information in FIG. 4 demonstrates the effect of increasing the power density (or reducing the irradiated surface for identical beam parameters) on the decays of both the intrinsic luminescence (the broad band in the ultraviolet and visible regions) and the characteristic fluorescence. Two particularly intense sharp bands corresponding to the yellow-green ($^4S_{3/2} \rightarrow {}^4I_{15/2}$) and the red ($^4F_{9/2} \rightarrow {}^4I_{15/2}$) emissions are decaying with relative high rates. These impurity bands in erbium originate from centers having a symmetry lower than cubic since emissions are forbidden in this latter environment. Therefore, interstitial fluorine ions located near trivalent cations, whatever the specific configuration, are involved in the mechanism of fluorescence emission, so that their ejection out of their corresponding environment leads to the observed quenching.

Writing Conditions—The writing process using quenching of impurity(extrinsic) fluorescence is identical to that employed for the creation of the color centers with the exception that electron beam powers and energies, and also the irradiation time, needed are much lower than for the latter process. Producing a large decrease in the efficiency of impurity fluorescence within small volumes constitutes the writing process. Each microscopic volume can be limited to the interaction volume of incident electrons, i.e., to that corresponding to the penetration depth of these electrons. As a result, one information bit has a size of the order of the electron size as long as the impurity concentration remains low. Accordingly, the density of bits that can be stored within the crystal readily exceed $10^8/cm^2$ (depending on injected energy densities). Furthermore, to the extent that moderately low powers are used for reading, the information stored is not modified by light illumination as is the case for color centers.

Retrieval conditions—Microscopic volumes having quenched impurity fluorescence constitute a set of information bits (data). These data are retrieved (read) by exciting these volumes by suitable radiation as for example, an electron beam generated in a scanning electron microscope. Great care must be taken because, as shown in FIG. 4, excitation by even a weak energetic electron beam can irreversibly erase some of the stored information if the power density injected into the optical crystal is not suitably controlled. The preferred operation delivers the lowest beam power over the largest irradiated surface. If this is not the case, because of repeated electron bombardment from repetitive reading of the data, the lifetime of the stored information is shortened. The loss of contrast can be significant after only a limited number of reading cycles. While this may appear as a disadvantage of the technology, because of the invisible character of the stored information and its great sensitivity to incident ionizing energy (i.e., to any retrieving operation which is not well controlled), this property is an advantage in a number of applications where a high degree of security is required as clandestine and improper accessing can protect the information by erasing or rendering unreadable the information.

For cadmium fluoride compounds doped with trivalent cations which exhibit a phosphorescence due mostly to existing centers with tetragonal symmetry (implying the presence of nearby fluoride ion), a focused beam of ultraviolet light can be used to excite the fluorescence of these centers so that retrieval of information is achievable. The small volumes out of which fluorine ions were ejected as a result of irradiation will not generate luminescence so that an information bit correspond now to the absence of phosphorescent in these volumes. In the case of insulating $CdF_2$ crystals doped with erbium, an optimal value of the rare-earth concentration which gives an efficient density of tetragonal centers, which are at the origin of the observed phosphorescence, ranges from about 0.005 mole % to about 0.05 mole % erbium, with the preferred concentration being about 0.01 mole %. At greater concentrations complex centers begin to form; below this range, cubic centers corresponding to isolated erbium ions are largely dominant. Isolated ions do not emit fluorescence.

Structures for Cadmium Fluoride Storage Medium

Three preferred structures for pattern storage in the cadmium fluoride compound which allow information to be retrieved under different use conditions are described below. These structures are not intended to limit the scope of the invention. Other versions and combinations are possible which do not modify significantly the functions described hereafter.

Figure 5:
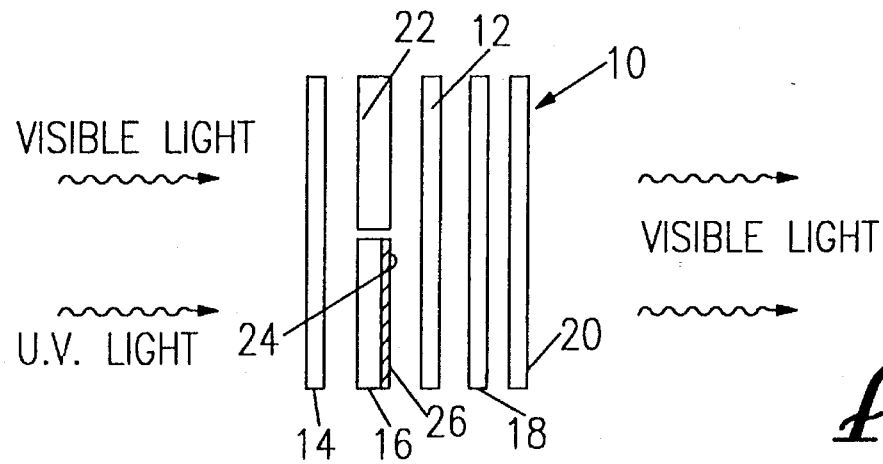
FIG. 5 is a schematic drawing showing a structure for retrieval of information using transmitted light.

The first two structures involve the absorption of visible and ultraviolet light by color centers. FIG. 5 shows schematically the arrangement of the first structure 10. The arrangement of the different elements makes possible the use of visible or ultraviolet light or both to illuminate the structure from one side, allowing retrieval of the information by transmitted visible light only. A cadmium fluoride crystal 12, either undoped (pure) or doped with monovalent and/or trivalent cations, or any other impurity which leads to the same effects, is sandwiched between a number of other elements 14, 16, 18, 20, 22. A pattern is stored in the crystal 12 by exposing it to the effect of a focused ionizing radiation, such as an electron beam. A pattern of information in analog or digital form created in the crystal 12 consists of small volumes containing F centers and their aggregates which absorb light, notably visible light. The thickness of the optical storage medium may vary but is preferably greater than the size of one element of information; i.e. about 100 microns or greater. The stored pattern can have any configuration but in the crystal bulk, and within the present structure, two separated regions which contain two smaller patterns which can be identical, complementary or have a relation defined by the user prior to the writing process are identified. As an example the patterns can be "analog" bars similar to the well known "bar code", with different dimensions and optical densities (color centers density).

Light enters the structure from one side, (i.e., as shown in FIG. 5, the left side) and exits the opposite side. The first element 14 is a strip of quartz glass (pure $SiO_2$) which transmits both visible and ultraviolet light. The upper portion 22 of the second element is a glass filter which transmits only the visible part of light entering through the quartz element 14. Hence, light reaching the pattern located in the upper part of cadmium fluoride element 12 contains no ultraviolet component. Such filter has a function similar to, for example, the UV(0) filter supplied by Hoya or U.V. Cokinlight by Cokin in the field of photography.

In contrast, the lower portion 16 of the second element is treated to only allow ultraviolet light to travel through it to reach the crystal 12. This element 16 is a second glass filter which eliminates the visible components of the spectrum and transmits only the ultraviolet part, resulting in what is commonly known as "black light". The multilayered glass filter U360 supplied by Hoya is an example of a type of filter that accomplishes this function.

One condition that the lower element 16 must satisfy is that its transmission must cover a range of wavelengths in the ultraviolet necessary to excite the photoluminescence of a fluorescent substance 24 (or a combination of more than one substance) deposited on the rear face of element 16. The thickness of this layer 24, which should not be transparent to visible or ultraviolet, is at least about 10 μm and the emitted fluorescence should be as bright as possible since this visible light will serve to illuminate the lower part of the storage medium 12 and thereby is used as "retrieving" light with respect to the lower pattern. A great number of fluorescent substances 24 are available which are excited by the 2537 A° radiation of an electric discharge in a low pressure mercury vapor lamp. Calcium halophosphates doped with antimony and/or manganese constitute a well known family among different fluorescent substances 24 which can be used. The anti U.V. filter 22 has a thickness equal to the sum of the thickness of filter 16 and the fluorescent layer 24. Spacer element 26 is a mylar block with thickness equal to that of the fluorescent layer 24. It prevents the fluorescent substance 24 layer from being flattened out by the crystal layer 12.

Element 18 is a polarizer whose function is to attenuate the light intensity reaching the cadmium fluoride element 12 from the other (exit) side of the structure (the right side in FIG. 5). This can be a polarizing glass similar to those used in photography like the PL filter of Hoya, or a simple organic polaroid sheet readily available from numerous suppliers.

Element 20 is identical to element 22; it prevents ultraviolet light irrespective of its origin from entering the structure from an undesired direction. As a result, the pattern in the lower part of cadmium fluoride is retrievable only in the "transmitted" mode, i.e., when light enters from one side (the left side) and exits from the other (the right side) in the direction of the objective of a magnifying system operating with visible light.

The resulting function of the structure of FIG. 5 is as follows:

a) A pattern stored in a defined region of the optical crystal 12 can be retrieved using white or monochromatic visible light from any readily available source. In this case, only information in the upper region of the crystal is read.

b) The pattern stored in the lower part of the optical crystal 12 can be retrieved independently of the upper portion by using an ultraviolet light source such as a vapor mercury lamp. No conversion is needed in the readout operation since visible light generated by fluorescent substances 24 transmitted from the exit side of the structure contains the information to be read.

c) The totality of information stored in the crystal 12, can be simultaneously retrieved if one uses a source providing visible and ultraviolet light (at the left side of FIG. 5) such as a fluorescent tube emitting both types of radiation. Although light colors corresponding to each pattern may be different owing to the broad absorption band of color centers in cadmium fluoride, retrieval of these patterns is not compromised.

d) The possibility of a simultaneous readout of both patterns allows a comparison between data in each of these patterns. The purpose of such a process is that since the data is stored at the same time under defined initial conditions, because the two patterns are accessed differently, information contained in the pattern accessible only with ultraviolet light will last a longer time than information in the visible light readable pattern.

As a result of the functioning of this structure, the pattern accessible with visible light has a lifetime intentionally shorter than that accessible with ultraviolet light. A criterion can then be defined whereby data stored in the upper (visible light) region in the crystal is no longer valid with respect to data in the lower (ultraviolet) region. Additional, this feature allows a determination as to whether the data in the upper region has been modified or tampered with.

As an example, since bleaching more efficiently effects regions where color centers density is lower or regions that are exposed to high levels of ambient light, the loss of contrast occurs when repeated readout is achieved. A simple comparison of the state of initially identical selected information allows the more bleached information to be validated and/or verified. This comparison can be achieved either visually or by means of simple viewing devices. The process is facilitated by the fact that the color centers absorb light of all wavelengths and appear strongly brownish at the limit of the black when read by visible light. The commercially available laser pens which achieve reading of "code bars" are good examples of devices which operate under defined conditions regarding "contrast levels", i.e. below a critical value of the difference between the intensities of light reflected back from the code bars and the surrounding areas, the information is not recognized by the laser pen.

The structure in FIG. 5 contains the basic elements which are necessary to read the stored information. When readout is achieved, this structure is essentially used in the transmission mode. However, when the size of the components pattern of the upper part of the crystal is not too small, readout of the data is possible in the "reflection" mode. In this case, intense visible light is focused onto the surface of the element 20 on the right side on the figure of the structure and is emitted from the same side of the structure where the readout is processed. This light is reflected (diffused) back by any bright non-granular opaque substance located against element 14 on the opposite end of the structure.

The different elements (the glass strips and filters) in FIG. 5 may have different thicknesses; however, because a magnifying device is used, the objective which is mostly based on a system of lenses, must have a small focal distance particularly at high magnifications. Since the pattern to be retrieved must be very close to the focal plane of the objective, it follows that the distance between the pattern, i.e., roughly the crystal surface, and the plane of the objective preferably does not exceed a few millimeters.

A general requirement is that the thickness of the set of elements above the crystal surface which contains the information, i.e., in FIG. 5, elements 18, 20, must be as small as possible. If such a structure is to be used in, for example, commercial credit cards or other similar readable data cards, then the overall thickness should be of the order of one millimeter; for a storage crystal with thickness of about 100 μm, the thickness of other elements is thus of the order of a few hundred of microns. The elements of FIG. 5 are maintained within the structure depending on type of application for the structure. If the purpose is to use unmodified stored information and the storage medium, then irreversible assembly of the different elements of the structure is achieved, such as by application of adhesives in the regions outside the volume which includes the area containing the information pattern. The elements can alternatively be welded along the edges.

If, on the other hand, it is desirable to carry out repeated storage cycles which require removal of the cadmium fluoride crystal from the structure, and isolating the structure, exposing it to a slow heating up to 240° C. so that a thermal bleaching occurs, erasing old information and allowing the crystal to be converted to a state suitable for a new cycle, and submitted the crystal to a new "writing" operation, the structure must be susceptible to disassembly. In this case, the structure thickness should not be very low in order to prevent or minimize mechanical breaking (few hundreds of microns). Moreover, only adhesives or welds that can be readily removed can be used.

Figure 6:
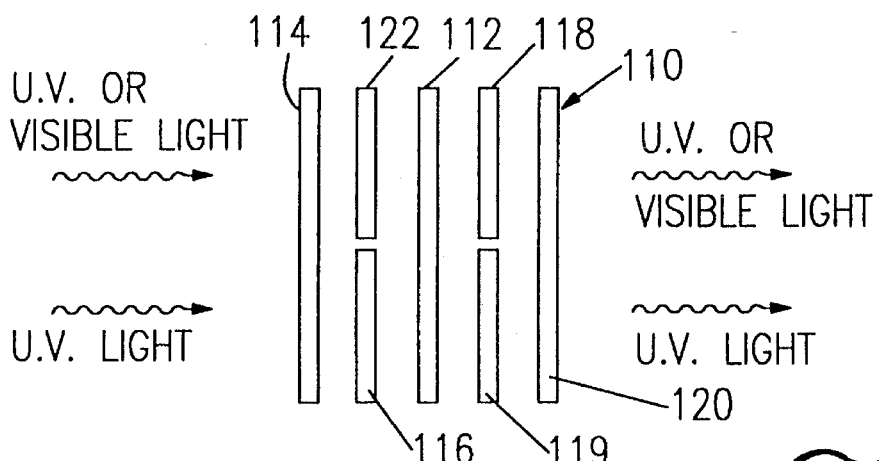
FIG. 6 is a schematic drawing showing a second structure for retrieval of information using transmitted light.

The function of the second proposed structure shown in FIG. 6 is similar to that of the structure in FIG. 5. Visible as well as ultraviolet light absorption by color centers in the cadmium fluoride crystal 112 is exploited in a readout operation and the storage crystal is processed similarly to element 12 in FIG. 5.

Elements 114, 122, 118 and 120 are strips of quartz glass which allow visible or/and ultraviolet light to enter the structure from both sides (only one direction is shown in FIG. 6) so that this light can reach the pattern stored in the upper region of the crystal 112. Elements 116 and 119 are two filters transmitting only "black light" and are similar to filter 16 of FIG. 5. Accordingly, only ultraviolet light illuminates the lower pattern in element 112. Depending on the type of information stored within the crystal 112, the information can be read from one side only or from either side.

The upper pattern in the crystal 112 is readily retrievable by visible, white or monochromatic lights. Furthermore, ultraviolet light may equally be used to retrieve both upper and lower patterns, and for this procedure ultraviolet light is used exclusively. In these cases, the exit light, which is also ultraviolet (near ultraviolet light is absorbed by color centers in crystal 112) so that the reading device must convert the invisible light into a visible image. One technique is to direct the ultraviolet image to a fluorescent screen or convert it electronically to yield a visible image.

The advantage of this structure is to allow an ultraviolet readout process of the two stored patterns as well as a visible readout of the image on the upper portion of the crystal 112. Because of the nature of the elements in this structure, information stored in the lower region of the crystal 112 is only slightly affected by irradiation by undesired ambient light, whereas, the upper stored pattern is more affected by visible light illumination and, accordingly, more sensitive to optical bleaching.

Therefore, depending on initial storing conditions, the state of the information, ie, the degree of bleaching (which is correlated to the variation of optical density) can be made to evolve much more rapidly in the upper pattern that in the lower. If a source of visible and ultraviolet light is used, both patterns can be simultaneously retrieved such that a visible image of the upper patterns and an ultraviolet image of the lower pattern can be observed. However, a magnifying system achieving this tandem operation is required.

Thickness of different elements of structure of FIG. 6 is such that it follows the same criteria as the structure of FIG. 5 discussed above.

Figure 7:
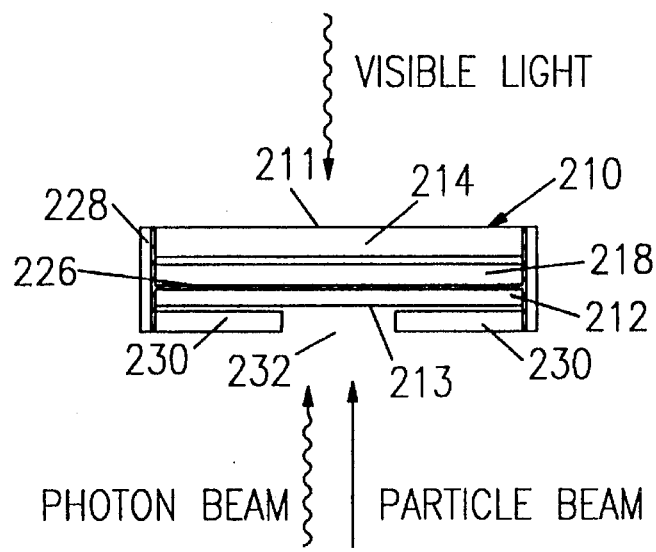
FIG. 7 is a schematic drawing of a third structure for use with an electron beam or a photon beam.

The third structure, shown in FIG. 7, also allows retrieval of data based on both color centers formation and impurity fluorescence quenching. Visible light entering the structure 210 from a first face 211 is detected when it exits from a second side 213 of the system. The exiting light carries information associated with the color centers present in the storage crystal 212. Element 214 is a silica glass strip and element 218 is a polarizer similar to the polarizer element 18 used in the embodiment of FIG. 5. The polarizer element 218 attenuates any unwanted incident light entering from the input side of the structure. A film of a transparent electrode material 226, such as indium oxide, is deposited on the rear face of the cadmium fluoride crystal 212. This film covers the entire surface with the exception of the edges of the structure which are welded with a conductive material 228. Two glass strips 230 partially cover the second face 213 of the crystal leaving an open central area 232 which allows access to the information on the crystal 212 to be read.

Information produced by ionizing irradiation, such an electron beam, are either F centers and their aggregates or small volumes where the density of impurity centers emitting fluorescence resulting from impurities has been dramatically reduced. These centers can be those emitting a phosphorescence, such as the tetragonal centers associated with the trivalent cations and interstitial fluorine ions. The information contained within the central area of the crystal 212 can be retrieved using either a beam of visible light (from the first side 211) or ultraviolet photons and/or ionizing radiation such as from an electron beam, from a second side 213 (as shown in FIG. 7).

When light absorption by color centers is used as in the structures of FIGS. 5 and 6, depending on the type of information stored within the pattern, light can reach the structure from the first or second side 211, 213. In such an instance only visible light can be used in the readout operation because the transparent electrode 226 absorbs the ultraviolet.

Other information that accompanies the build-up of color centers can be retrieved by means of an ionizing radiation, such as an electron beam. Intrinsic luminescence decay, secondary or X-ray characteristic emissions quenching, specimen current inhibition etc. are some phenomena associated with this information. The structure of FIG. 7 is suitable for a retrieving process which provides an energetic ionizing beam, such as in a scanning electron microscope. The conductive film 226 deposited on the crystal 212 serves to establish a good metallic contact between the rear face of the irradiated material and the sample holder in the vacuum chamber of the device providing the ionizing radiation (the electron radiation)/ by means of the conductive surface 228 welded to the sides of the structure. Only the face which contains information is submitted to the ionizing beam, i.e., the lower surface 213.

Since the impurity fluorescence is excited by the same radiation, the same face and thus the same side of the structure are irradiated during the reading operation. In the case of phosphorescent centers, excitation by a focused ultraviolet beam around 300 nm is also possible. The structure 210 allows the use of most types of radiation and accordingly makes possible a readout of various different types of data that can be stored within the cadmium fluoride crystal 212. On the other hand, comparison between stored information is also achievable if some of the information initially have a density of color centers (optical density) greater than other stored information. The less "dense" information will be bleached more efficiently and their contrast is lost more rapidly, i.e. their lifetime is reduced with respect to the more "dense" information.

The three structures described above are presented for illustration rather than limitation. For example, the polarizer 18 in structure 10 of FIG. 5 can be omitted without modifying its basic function. Moreover, a second polarizer on the other side of this structure can be added, or two additional polarisers can be introduced on either side of the structure 110 of FIG. 6 without altering the system. In these cases and for linearly polarized materials the transmission axes must be parallel or differ by only a small angle; otherwise, according to Malus law, the intensity of light coming out of these two polarisers will be strongly reduced (proportional to the square of cosine of the angle between the two transmission axes).

If the anti-U.V. glass 20 is omitted from the structure of FIG. 5, ultra-violet light can be used to retrieve the pattern on the upper portion of the crystal 12. Although the structure is modified, no fundamental change occurs as long as the cadmium fluoride crystal 12 is the storage medium, the stored information is based on color centers and/or impurity fluorescence quenching and visible and/or ultraviolet light are allowed to retrieve the stored patterns.

Accordingly, it has been found that $CdF_2$ and suitably doped $CdF_2$, particularly when presented as a continuous substrate, can be an efficient means of information storage. To do so the phenomena of color centers and impurity fluorescence quenching are used as storage means. Because the color centers in $CdF_2$ have a definable range of lifetime based on thermal and optical beaching, information on products can be designed to self erasing and self destruct. Because the color centers respond to various frequencies of light, visible or UV light, either separately or simultaneously, can be used to retrieve a stored pattern. Further, since information can be stored to be read by the naked eye or using high levels of magnification, various different levels of information can be retrieved. For example, information requiring a more restricted access can be stored so that it is readable by only very sophisticated and expensive equipment, such as an electron microscope or instruments to monitor fluorescence emission, while less sensitive information can be available under reasonable magnification and nonsensitive information can be viewed by the naked eye without the more sensitive information being available. It is also possible, since information stored by different means can have a different storage life, that certain information can be stored and readily erased (bleached) while other information can have a much longer storage life.

What is claimed is:

1. A device for storing information for repetitive retrieval comprising:
    a) a film comprising a cadmium fluoride crystal said film being sandwiched between first and second elements transparent to light, the second element being formed of two portions, the first element and at least the first portion of the second element being transparent only to visible light and the second portion of the second element being transparent only to ultraviolet light, the second portion of the second element having coated thereon, on the surface next to the cadmium fluoride crystal, a transparent material which fluoresces when exposed to ultraviolet light, the first and second elements and the materials sandwiched therebetween comprising a central structure,
    b) a polarizing element located between the cadmium fluoride film and the first element,
    c) the central structure being sandwiched between first and second barriers, the first barrier, adjacent the second element, being transparent to visible light and ultraviolet light and the second barrier being transparent only to visible light,
information being stored in the cadmium fluoride crystal by exposure to a focused ionizing beam, said focused ionizing beam creating readable patterns in the crystal.

2. The device of claim 1 wherein the information is stored in the cadmium fluoride crystal by creation of changes in the crystal structure, the changes being selected from the group consisting of color centers, intrinsic luminescence quenched areas and combinations thereof.

3. The device of claim 2 wherein two sets of information are stored in the cadmium chloride crystal, the first set of information being recovered by transmission of visible light therethrough and the second set of information being located so that light generated by fluorescence passes therethrough.

4. The device of claim 1 or claim 3 wherein the information is retrieved by transmitting light from a source positioned at one end of the sandwiched elements such that the light passes through the crystal, and the information is collected by reading means intercepting the light after the light passes through the crystal, the transmitted light being modified by the stored information as it passes through the crystal.

5. The device of claim 4 wherein the source of the light and the reading means are both adjacent the second barrier, a reflective medium being located adjacent the first barrier.

6. The device of claim 4 wherein the source of the light is adjacent the first barrier and the reading means is adjacent the second barrier.

7. A device for storing information for repetitive retrieval comprising:
    a) a film comprising a cadmium fluoride crystal said film being sandwiched between first and second elements transparent to light, the first and second elements each being formed of two portions, the first portion of the each element being transparent only to visible light, said first portion being located in an upper region of the device, and said second portion of the each element being transparent only to ultraviolet light, said second portion being located in a lower portion of the device, the first and second elements comprising a central structure,
    b) the central structure being sandwiched between first and second barriers, the first and second barriers being transparent to visible light and ultraviolet light,
information being stored in the cadmium fluoride crystal by exposure to a focused ionizing beam, said focused ionizing beam creating readable patterns in the crystal, the information being stored in the cadmium fluoride crystal by creation of changes in the crystal structure by focused ionizing radiation, the changes being selected from the group consisting of color centers, intrinsic luminescence quenched areas and combinations thereof.

8. The device of claim 7 wherein two sets of information are stored in the cadmium fluoride crystal, the first set of information being recovered by transmission of visible light therethrough and the second set of information being recovered by the transmission of ultraviolet light therethrough.

9. The device of claim 8 wherein the information is retrieved by transmitting light from a source positioned at one end of the sandwiched elements such that the light passes through the crystal, and the information is collected by reading means intercepting the light after the light passes through the crystal, the transmitted light being modified by the stored information as it passes through the crystal.

10. A device for storing information for repetitive retrieval by transmission of light therethrough, comprising:
    a) a film comprising a cadmium fluoride crystal said film being sandwiched between first and second elements transparent to visible light, the first element receiving light transmitted from a source and the second element polarizing light impinging thereon after passing through the first element and the crystal,
    b) a transparent conductive film located between the crystal and the second element,
    c) the crystal, first element and second element being surrounded by a conductive material, said conductive material being communicating electrically with the conductive film,
information being stored in the cadmium fluoride crystal by exposure to a focused ionizing beam, said focused ionizing beam creating readable patterns in the crystal, the information being stored in the cadmium fluoride crystal by creation of changes in the crystal structure by focused ionizing radiation, the changes being selected from the group consisting of color centers, intrinsic luminescence quenched areas and combinations thereof, and the information being retrieved by exposure of the portion of the crystal containing the stored information to irradiation.

11. The device of claim 9 wherein the exposure is caused by irradiation selected from the group consisting of visible light, ultraviolet light and an ionizing beam.

12. A method for the optical storage and retrieval of information comprising:

selecting a cadmium fluoride crystalline substrate, creating an information bearing pattern in the substrate, said pattern selected from the group consisting of color centers and intrinsic luminescence quenching areas, by focusing an ionizing beam at selected locations on said substrate, reading the information by transmitting an irradiating beam through the portion of the substrate in which the pattern was formed, the irradiating beam selected from the group consisting of visible light, ultraviolet light, ionizing radiation and combinations thereof.

13. The method of claim 11 wherein the information bearing pattern is selectively programmed to be reliably readable for a specified length of time by controlling the density of the stored information and the amount of added dopants.

14. The method of claim 11 wherein the ionizing beam is delivered by an electron microscope.

15. The method of claim 11 wherein the ionizing radiation used to read the information is delivered by an electron microscope.

16. The method of claim 11 wherein the reading of the information is facilitated by use of a magnifying device.

17. The method of claim 11 wherein the information bearing pattern can simultaneously include several different levels of information, the different levels of information being retrievable by using different reading techniques, different levels of magnification, and different irradiating beams.

* * * * *